3,445,483
ORGANOSILICON EPOXIDES
Roger G. Chaffee, Midland, Mich., assignor to Dow Corning Corporation, Midland, Mich., a corporation of Michigan
No Drawing. Continuation-in-part of application Ser. No. 531,021, Mar. 2, 1966. This application Mar. 31, 1966, Ser. No. 538,974
Int. Cl. C07f 7/08; C07d 1/12; C08g 31/32
U.S. Cl. 260—348          8 Claims

ABSTRACT OF THE DISCLOSURE

Organosilicon compounds of the class of epoxy functional silcarbanes in which the epoxide group is attached to the silicon atom via an SiC linkage, the silicon atoms in the compounds being bridged by a phenylene linkage, i.e.,

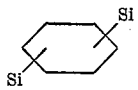

Illustrative of an epoxy functional silcarbane as defined is a compound of the formula

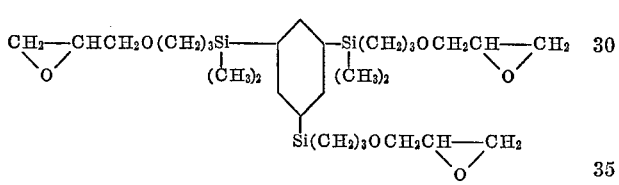

The epoxy functional silcarbanes are useful for modifying organic resins.

---

This invention relates to organosilicon epoxides wherein the radical containing the epoxy group is attached to the silicon atom via Si-C bonds. This application is a continuation-in-part of applicant's co-pending application Ser. No. 531,021, filed Mar. 2, 1966, and now abandoned.

It is well known that epoxide resins can be modified by the incorporation of various types of organosilicon compounds. This has been achieved by simply blending organosilicon compounds with epoxide resins or by reacting chlorosilanes, alkoxysilanes, or partial hydrolyzates thereof, or hydroxylated organosilicon compounds with an epoxide resin. It is believed that the reaction proceeds by condensation of the functional group on the silicon atom, that is OH, OR, or halogen, with the hydroxyl radicals in the epoxide resin or with the epoxy group itself in the case of chlorosilanes.

These known procedures have resulted in useful silicone-modified epoxide resins. However, in all cases the materials were either merely blends or the silicon portion was attached to the epoxide resin through SiOC linkage. It is also well known that this linkage is essentially hydrolytically unstable, and as a consequence is much less resistant to alkali and other hydrolytic reagents than other possible linkages in an epoxide resin. Therefore, in numerous applications, the resultant instability is an important disadvantage.

It is an object of this invention to provide novel compositions of matter having an epoxy group attached to the silicon atom through an SiC bond, thus overcoming the disadvantages related above. More particularly, it is an object of this invention to provide novel epoxy functional silcarbane compounds in which the epoxide group is attached to the silicon atom through an SiC linkage, said silicon atoms in the above compounds being bridged by a phenylene linkage, i.e.

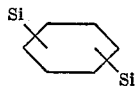

It is also an object of this invention to make available novel compositions of matter which are useful in the preparation of coating resins, laminates, and as intermediates in the preparation of other organosilicon materials. It is a further object of this invention to provide coating resins and laminates that exhibit improved and superior characteristics to those known heretofore by the use of the novel compounds shown hereafter.

These and other objects will be readily apparent from the following detailed description of the invention.

This invention relates to compositions of matter consisting essentially of epoxy functional silcarbanes selected from the group consisting of

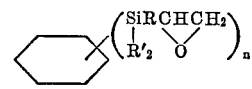

and

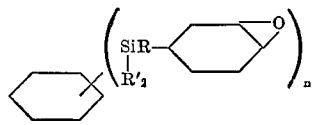

in which

R is any divalent hydrocarbon radical free of aliphatic unsaturation, or hydrocarbon ether radical, R' is any monovalent hydrocarbon or halohydrocarbon radical, and n is an integer of from 2 to 4 inclusive.

Thus, for purposes of this invention, R can be any divalent hydrocarbon radical free of aliphatic unsaturation such as methylene, ethylene, propylene, isopropylene, butylene, isobutylene, phenylene, xenylene, decylene, tolylene, or

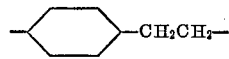

among others. In addition, R can also be any divalent hydrocarbon ether radical such as

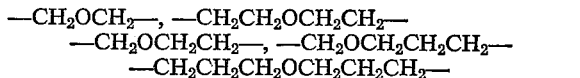

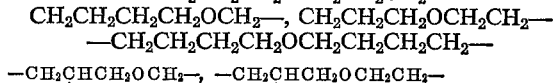

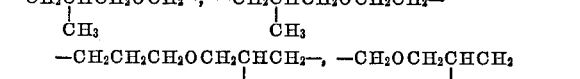

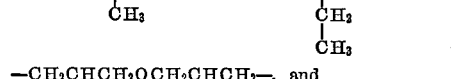

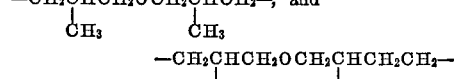

among others.

R' can be any monovalent hydrocarbon or halohydrocarbon radical such as methyl, ethyl, propyl, isopropyl, butyl, isobutyl, decyl, dodecyl, octadecyl, myricyl, pentyl, isopentyl, hexyl, isohexyl, cyclohexyl, cyclobutyl, cyclohexenyl, vinyl, allyl, methallyl, hexenyl, octadecenyl, β-phenylpropyl, β-phenylethyl, phenyl, tolyl, xylyl, ethylphenyl, mesityl, methylethylphenyl, n-propylphenyl, isopropylphenyl, diethylphenyl, pentamethylphenyl, amylphenyl, butylmethylphenyl, propylmethylphenyl, ethyltrimethylphenyl, diethylmethylphenyl, hexylphenyl, cyclohexylmethylphenyl, amylmethylphenyl, butylethylphenyl, butyldimethylphenyl, propylethylmethylphenyl, diphenyl, dipropylphenyl, naphthyl, 1-methylnaphthyl, 2-methylnaphthyl, 1-ethylnaphthyl, phenylnaphthyl, anthracyl, 9-methylanthracyl, 2,3-dimethylanthracyl, 2,4-dimethylanthracyl, 9-ethylanthracyl, phenanthryl, 3-methylphenanthryl, chlorobenzyl, iodo-β-phenylpropyl, chloromethyl, chloropropyl, bromomethyl, chlorobutyl, bromopropyl, 3,3,3-trifluoropropyl, gamma-chloropropyl, (perfluoroethyl) ethyl, (perfluoropentyl) ethyl, (perfluorononyl) ethyl, iodophenyl, α,α,α-trifluorotolyl, perfluorocyclohexenyl, bromophenyl, o-bromotolyl, m-bromotolyl, p-bromotolyl, o-chlorotolyl, m-chlorotolyl, p-chlorotolyl, 2-chloro-m-fluorotolyl, 4-bromo-o-xylyl, dichloroxylyl, 5-bromo-m-xylyl, 2-bromo-p-xylyl, 2-bromomesityl, 3-bromo-o-tolyl, 2-bromo-1-ethylphenyl, 4-bromo-1,3-diethylphenyl, 6-bromo-3-ethyltolyl, 2-bromo-4-ethyltolyl, 4-bromo-1-propylphenyl, 4-bromo-1-isopropylphenyl, 4-bromo - 1 - methyl-3-isopropylphenyl, 4-bromo-1-tertiary-butylphenyl, 4 - bromo - 1 - tertiary - amylphenyl, chlorophenyl, α-bromophenyl, β-bromophenyl, 2-chloronaphthyl, 1-bromo-3-chloronaphthyl, 2-chloro-1-methylnaphthyl, 1-bromo-8-methylnaphthyl, 1-bromo-2,3-dimethylnaphthyl, 1-bromo - 4 - methylnaphthyl, 1,10 - dibromoanthracyl, 9,10-dichloroanthracyl, among others.

It is to be noted that $n$ is an integer of from 2 to 4 inclusive, therefore a maximum of 4 carbon atoms of the phenylene ring can be substituted with epoxy groups via a Si—C linkage, the remaining carbon atoms of the phenylene ring being substituted with hydrogen atoms.

The epoxy functional silcarbanes of this invention can be readily prepared by reacting a silicon compound containing a silicon-bonded hydrogen atom with certain compounds containing aliphatic unsaturation. The reaction proceeds by the addition of the silicon-hydrogen bond across a pair of aliphatic carbon atoms linked by multiple bonds, i.e., C=C. An illustration of the general reaction is as follows:

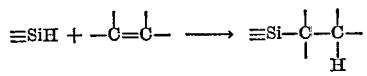

As heretofore indicated, the silicon compound used in the above reaction must contain a phenylene linkage and at least one H atom linked to silicon per silicon. Thus, any silicon compound of the general formula

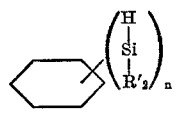

in which R' and $n$ are as above defined can be effectively employed. Also, as heretofore related, any epoxy compound containing aliphatic unsaturation can be used. Thus, by reacting these compounds as generally described above, the novel epoxy functional silcarbanes can be obtained and the objects of this invention achieved.

It is to be noted that where there are to be more than two epoxy groups attached to the phenylene ring, precursors for obtaining such compounds in accordance with the above procedure can be found in U.S. application Ser. No. 417,466, filed on Dec. 10, 1964, and now Patent No. 3,280,073, which is hereby incorporated by reference.

This invention also relates to a polymeric composition prepared by polymerizing the composition as recited in claim 1 wherein the curing occurs through the epoxy groups. Said curing is conducted by conventional means well known in the art as related hereinbelow. The above polymeric compositions contain

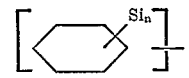

repeating units in which $n$ is as defined above, the silicon atoms being attached to the phenylene ring through Si—C linkage, the remaining valences of the silicon atom being satisfied by the groups hereinbefore related.

The above polymeric epoxy-organo compounds herein described can be prepared by reacting the epoxy functional silcarbanes of this invention with conventional epoxide curing agents such as amines, polyamides, polyhydroxy compounds, polycarboxylic acids, and acid anhydrides, aminoplast resins, alkyd resins, and phenolic resins, among others. The reaction proceeds at temperatures ranging from room temperature up to 200° C. By this means, the compositions of this invention can be formed into cured moldings, castings, and films. These resins are excellent for coating metals and glass and are also useful as adhesives.

It is to be noted that the epoxy silicon compounds of this invention can be employed to modify organic resins. They can be incorporated into any organic resin which possesses a functional group containing an active hydrogen. Thus, for example, they can be incorporated into epoxide resins, alkyd resins, aminoplast resins, polyamide resins, and other organosiloxanes containing organic functional groups such as hydroxyl, amino, carboxyl, or amide groups. The modified products made by reacting organic resins with the products of this invention are useful as lubricants, coating compositions, casting resins, and paints.

The compositions of this invention can also be used as intermediates in the preparation of organic modified silicon compounds in which the modification occurs by reaction of the epoxy group with a reagent. Therefore, it is possible to employ the compositions of this invention to prepare a wide variety of organo-functional modified organosilicon compounds in all of which the organo-functional group is attached to silicon through a silicon-carbon linkage. Specific examples of such relations and the derivatives obtained thereby are the reaction of the epoxy with water to obtain a glycol, with hydrogen chloride to obtain a chlorohydrin, with phosphoric to obtain a hydroxyalkyl phosphate ester, with carboxylic acids to obtain hydroxy esters, with ammonia or amines to obtain hydroxyalkyl amines, with hydrocyanic acid to obtain cyanohydrins, with sodium sulfate to obtain the hydroxyalkyl sodium sulfonate, with phenols to obtain hydroxy phenylethers, with Grignard reagents to obtain hydroxy alcohols, with alcohols to obtain hydroxyalkyl ethers, with aldehydes and ketones to obtain acetals, with hydrogen sulfide to obtain hydroxy thiols, with nitric acid to obtain hydroxyalkyl nitrate esters, and with mercaptans to obtain hydroxyalkyl thioethers. In addition, the epoxy group can be reduced with hydrogen to obtain alcohols.

The above derivatives can be used as emulsifiers, plasticizers for organic and organosilicon resins, as lubricants, as intermediates in the preparation of organosilicon resins and as modifiers for organic resins.

The following examples are illustrative only and should not be construed as limiting the invention which is properly delineated in the appended claims.

Example 1

To a three-liter, three-neck flask equipped with a dropping funnel, thermocouple, air stirrer, and condenser there was added a platinum catalyst, 97.21 grams of

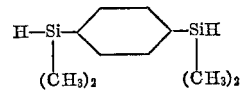

and 500 ml. of technical grade toluene. The above mixture was heated to reflux and 1 mole of allyl glycidyl ether added dropwise via the dropping funnel over approximately a 4 hour period. After a complete addition was effected, a compound of the formula $$CH_2\text{—}CHCH_2O(CH_2)_3\text{—}Si\text{—}\underset{(CH_3)_2}{\bigcirc}\text{—}Si(CH_2)_3OCH_2CH\text{—}CH_2$$
$$\underset{O}{\diagdown\diagup}\qquad\qquad\qquad\qquad\underset{(CH_3)_2}{\phantom{Si}}\qquad\underset{O}{\diagdown\diagup}$$

was obtained.

Example 2

When 1 mole of a compound of the formula $$\underset{(CH_3)_2}{\overset{HSi}{|}}\bigcirc\underset{\underset{(CH_3)_2}{SiH}}{\overset{SiH}{|}}\;(CH_3)_2$$

was substituted for the corresponding compound in Example 1, and 3 moles of allyl glycidyl ether appropriately added, a compound of the formula $$(CH_3)_2\text{—}Si(CH_2)_3OCH_2CH\text{—}CH_2$$
$$CH_2\text{—}CHCH_2O(CH_2)_3Si\text{—}\bigcirc\text{—}Si(CH_2)_3OCH_2CH\text{—}CH_2$$

was obtained.

Example 3

When 1 mole of a compound of the formula $$\bigcirc\underset{(CH_3)_2}{\overset{(SiH)_4}{\times}}$$

is substituted for the corresponding compound in Example 1, and 4 moles of allyl glycidyl ether appropriately added, a compound of the formula $$\bigcirc\underset{(CH_3)_2}{\overset{(Si(CH_2)_3OCH_2CH\text{—}CH_2)_4}{\times}}$$

was obtained.

Example 4

When vinylcyclohexene oxide is substituted for the allyl glycidyl ether in Example 1, a compound of the formula $$O\text{—}\bigcirc\text{—}CH_2CH_2Si\text{—}\bigcirc\text{—}SiCH_2CH_2\text{—}\bigcirc\text{—}O$$
$$(CH_3)_2\qquad(CH_3)_2$$

was obtained.

Example 5

When the following compounds are substituted for the allyl glycidyl ether and (p-bis-dimethylhydrogensilyl)-benzene of Example 1, the designated epoxy silcarbanes are obtained.

(1)
$$2(H_2C\text{—}CH(CH_2)_3\text{—}O\text{—}CH_2CH=CH_2) + H\text{—}Si\text{—}\bigcirc\text{—}Si\text{—}H \longrightarrow$$
$$(CH_2CH_3)_2\;(CH_2CH_3)_2$$
$$H_2C\text{—}CH(CH_2)_3\text{—}O\text{—}(CH_2)_3\text{—}Si\text{—}\bigcirc\text{—}Si\text{—}(CH_2)_3\text{—}O\text{—}(CH_2)_3CH\text{—}CH_2$$
$$(CH_2CH_3)_2\quad(CH_2CH_3)_2$$

(2)
$$2(H_2C\text{—}CH(CH_2)_5CH=CH_2) + H\text{—}Si\text{—}\bigcirc\text{—}Si\text{—}H \longrightarrow$$
$$(CH_3)_2\;(CH_2CH_2CH_3)_2$$
$$H_2C\text{—}CH(CH_2)_5CH_2CH_2\text{—}Si\text{—}\bigcirc\text{—}Si\text{—}CH_2CH_2(CH_2)_5CH\text{—}CH_2$$
$$(CH_3)_2\quad(CH_2CH_2CH_3)_2$$

(3)
$$2(H_2C\text{—}CHCH_2\text{—}O\text{—}CH=CH_2) + H\text{—}Si\text{—}\bigcirc\text{—}Si\text{—}H \longrightarrow$$
$$(CH_2CH_2CH_3)_2\;(CH_2CH_2CH_3)_2$$
$$H_2C\text{—}CHCH_2CH_2CH_2\text{—}Si\text{—}\bigcirc\text{—}Si\text{—}CH_2CH_2CH_2CH\text{—}CH_2$$
$$(CH_2CH_2CH_3)_2\;(CH_2CH_2CH_3)_2$$

(4)
$$2(H_2C\text{—}CH(CH_2)_6CH=CH_2) + H\text{—}Si\text{—}\bigcirc\text{—}Si\text{—}H \longrightarrow$$
$$(CH_2Cl)_2\;(CH_2Cl)_2$$
$$H_2C\text{—}CH(CH_2)_6CH_2CH_2\text{—}Si\text{—}\bigcirc\text{—}Si\text{—}CH_2CH_2(CH_2)_6CH\text{—}CH_2$$
$$(CH_2Cl)_2\quad(CH_2Cl)_2$$

(5)
$$2(H_2C\text{—}CHCH_2CH_2CH=CH_2) + H\text{—}Si\text{—}\bigcirc\text{—}Si\text{—}H \longrightarrow$$
$$(CH_2CH_3)_2\;\underset{CH_3}{(CH_2CHCH_3)_2}$$
$$H_2C\text{—}CHCH_2CH_2CH_2CH_2\text{—}Si\text{—}\bigcirc\text{—}Si\text{—}CH_2CH_2CH_2CH_2CH\text{—}CH_2$$
$$(CH_2CH_3)_2\quad\underset{CH_3}{(CH_2CHCH_3)_2}$$

(6)
$$2(H_2C\text{—}CH(CH_2)_3O(CH_2)_3CH=CH_2) + H\text{—}Si\text{—}\bigcirc\text{—}Si\text{—}H \longrightarrow$$
$$(CH_3)_2\;(CH_2CH_2CH_2Br)_2$$
$$H_2C\text{—}CH(CH_2)_3O(CH_2)_3CH_2CH_2\text{—}Si\text{—}\bigcirc\text{—}Si\text{—}CH_2CH_2(CH_2)_3\text{—}O(CH_2)_3CH\text{—}CH_2$$
$$(CH_3)_2\quad(CH_2CH_2CH_2Br)_2$$

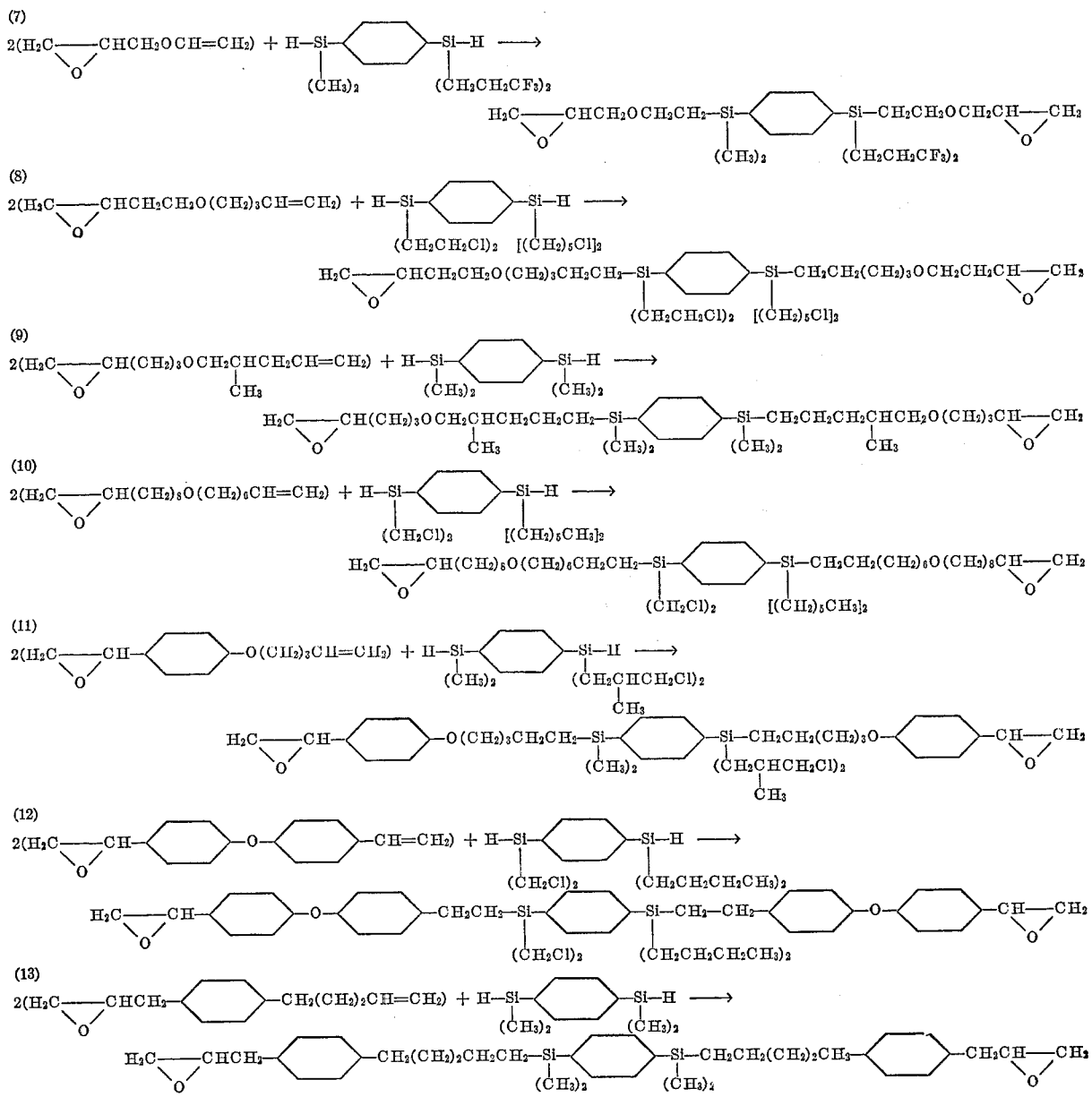
Example 6
5 grams of
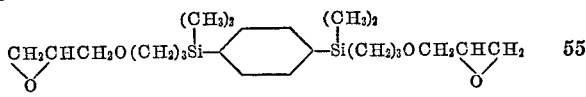 55
was mixed with 1.17 grams of methylene dianiline. The admixture was heated overnight at a temperature of 120° C., and a compound of the formula
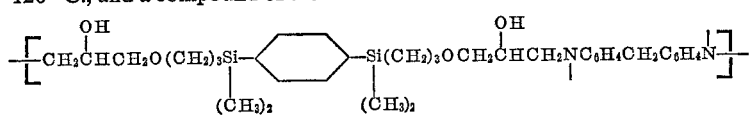
was obtained.
Example 7
When p-HOC$_6$H$_4$HO is substituted for the methylene dianiline in Example 3, a compound of the formula
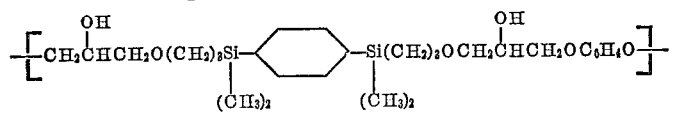
was obtained.

Example 8

When p-HSC₆H₄SH is substituted for the methylene dianiline in Example 3, a compound of the formula

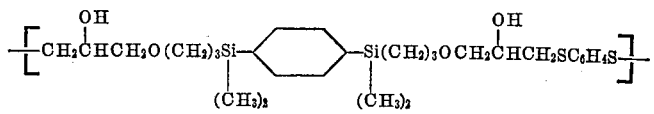

was obtained.

Example 9

When a fumaric acid is substituted for the methylene dianiline in Example 3, a compound of the formula

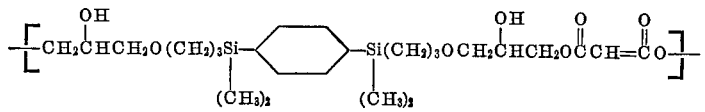

was obtained.

EXAMPLE 10

When phthalic anhydride is substituted for the methylene dianiline in Example 3, a compound of the formula

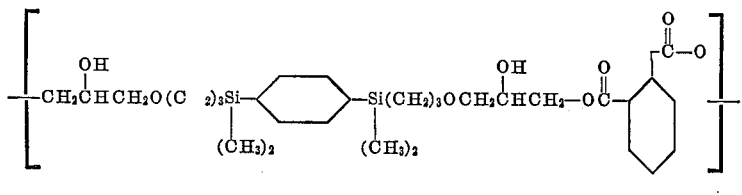

was obtained.

Example 11

5 grams of

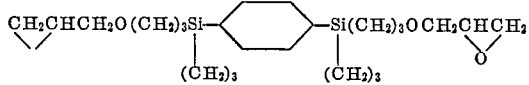

was mixed with 2.6 grams of

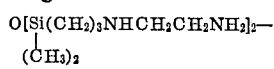

The admixture was heated overnight at 120° C. and a polymer containing units of the formula

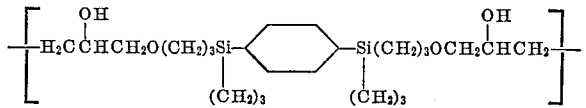

and, units of the formula

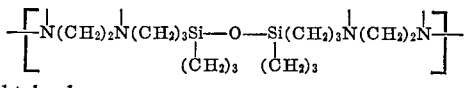

was obtained.

That which is claimed is:

1. An organosilicon compound selected from the group consisting of

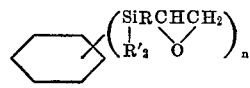

and

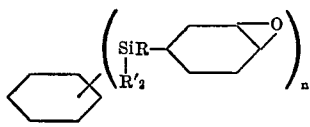

in which

R is selected from the group consisting of a hydrocarbon radical free of aliphatic unsaturation containing from 1 to 12 carbon atoms inclusive and a hydrocarbon ether radical containing from 1 to 12 carbon atoms inclusive, R' is selected from the group consisting of a monovalent hydrocarbon radical containing from 1 to 6 carbon atoms inclusive and a monovalent halohydrocarbon radical containing from 1 to 6 carbon atoms inclusive, and $n$ is an integer of from 2 to 4 inclusive.

2. An organosilicon compound as recited in claim 1 consisting of

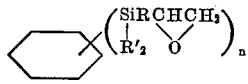

3. An organo silicon compound as recited in claim 1 consisting of

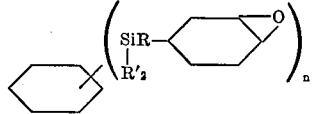

4. An organosilicon compound as recited in claim 1 wherein $n$ has a value of 2.

5. An organosilicon compound as recited in claim 1 wherein $n$ has a value of 3.

6. An organosilicon compound as recited in claim 1 wherein $n$ has a value of 4.

7. An organosilicon compound as recited in claim 1 in which
R is a —$(CH_2)_3OCH_2$— radical,
R' is a methyl radical, and
$n$ is an integer of 2.

8. An organosilicon compound as recited in claim 1 in which
R is a —$(CH_2)_3OCH_2$— radical,
R' is a methyl radical, and
$n$ is an integer of 3.

References Cited

UNITED STATES PATENTS 3,120,546   2/1964   Plueddemann _____ 260—348

FOREIGN PATENTS 598,696   5/1960   Canada.

HENRY R. JILES, *Primary Examiner.*

S. WINTERS, *Assistant Examiner.*

U.S. Cl. X.R.

260—46.5, 448.2